United States Patent
Bogrett

(10) Patent No.: US 12,028,336 B2
(45) Date of Patent: Jul. 2, 2024

(54) HIGHLY AVAILABLE WEB-BASED DATABASE INTERFACE SYSTEM

(71) Applicant: Xactly Corporation, Los Gatos, CA (US)

(72) Inventor: Steve Bogrett, San Jose, CA (US)

(73) Assignee: Xactly Corporation, Los Gatos, CA (US)

( * ) Notice: Subject to any disclaimer, the term of this patent is extended or adjusted under 35 U.S.C. 154(b) by 0 days.

(21) Appl. No.: 18/453,057

(22) Filed: Aug. 21, 2023

(65) Prior Publication Data

US 2023/0396608 A1 Dec. 7, 2023

Related U.S. Application Data

(63) Continuation of application No. 17/566,813, filed on Dec. 31, 2021, which is a continuation of application
(Continued)

(51) Int. Cl.
*G06F 16/00* (2019.01)
*G06F 16/9038* (2019.01)
(Continued)

(52) U.S. Cl.
CPC ........ *H04L 63/083* (2013.01); *G06F 16/9038* (2019.01); *G06F 16/95* (2019.01);
(Continued)

(58) Field of Classification Search
None
See application file for complete search history.

(56) References Cited

U.S. PATENT DOCUMENTS

| 7,965,630 B1 | 6/2011 | Floyd et al. |
| 9,246,819 B1 | 1/2016 | Thirasuttakorn |

(Continued)

OTHER PUBLICATIONS

Korean Intellectual Property Office, "Search Report" in application No. PCT/US2018/015748, dated May 31, 2018, 5 pages.
(Continued)

*Primary Examiner* — Anhtai V Tran
(74) *Attorney, Agent, or Firm* — Baker Botts L.L.P.

(57) ABSTRACT

Techniques are provided for a highly available web-based database interface system (WDIS) processing database requests that target one or more databases managed by a coupled DBMS. In an embodiment, a web server of multiple web servers receives a first client web-based request that includes one or more first database instructions of a database request. The multiple web servers are configured to balance client web-based requests among one or more of the multiple web servers. The one or more of the multiple web servers are coupled to a database management system that includes one or more database servers executing database instructions on one or more databases. Based on balancing client web-based requests among the one or more of the multiple web servers, routing the first client web-based request that includes the one or more first database instructions of the database request to the first web server of the one or more multiple web servers coupled to the database management system. A request coordinator store coupled to the one or more of the multiple web server is queried. to determine a state of the database request. Based at least in part on the state of the database request, the first web server requests the database management system to execute the one or more first database instructions and update the state.

20 Claims, 8 Drawing Sheets

Related U.S. Application Data

No. 16/551,538, filed on Aug. 26, 2019, now Pat. No. 11,218,470, which is a continuation of application No. 15/728,421, filed on Oct. 9, 2017, now Pat. No. 10,397,218, which is a continuation of application No. 15/419,051, filed on Jan. 30, 2017, now Pat. No. 9,787,671.

(51) Int. Cl.
*G06F 16/95* (2019.01)
*G06F 16/958* (2019.01)
*H04L 9/40* (2022.01)
*H04L 67/01* (2022.01)
*H04L 67/02* (2022.01)
*H04L 67/1001* (2022.01)
*H04L 67/60* (2022.01)

(52) U.S. Cl.
CPC ............ *G06F 16/958* (2019.01); *H04L 63/08* (2013.01); *H04L 67/01* (2022.05); *H04L 67/02* (2013.01); *H04L 67/1001* (2022.05); *H04L 67/60* (2022.05)

(56) References Cited

U.S. PATENT DOCUMENTS

| | | | |
|---|---|---|---|
| 2004/0059864 A1* | 3/2004 | Hardman | G06F 11/2069 |
| | | | 707/E17.116 |
| 2005/0114454 A1* | 5/2005 | D'Angelo | H04L 67/56 |
| | | | 709/206 |
| 2006/0155759 A1 | 7/2006 | Ramachandran | |
| 2007/0168336 A1* | 7/2007 | Ransil | G06F 16/958 |
| 2009/0006531 A1 | 1/2009 | Gillum et al. | |
| 2009/0157678 A1 | 6/2009 | Turk | |
| 2009/0199201 A1 | 8/2009 | Smith, Jr. | |
| 2009/0199210 A1* | 8/2009 | Smith, Jr. | H04L 67/02 |
| | | | 719/315 |
| 2012/0284296 A1 | 11/2012 | Arifuddin et al. | |
| 2012/0297237 A1 | 11/2012 | Chatterjee | |
| 2013/0080656 A1 | 3/2013 | Kukreja et al. | |
| 2014/0310418 A1* | 10/2014 | Sorenson, III | H04L 67/1038 |
| | | | 709/226 |
| 2016/0337464 A1* | 11/2016 | Eriksson | H04L 67/568 |
| 2018/0219852 A1 | 8/2018 | Bogrett | |

OTHER PUBLICATIONS

Korean Claims in application No. PCT/US2018/015748, dated May 2018, 5 pages.

Bogrett, U.S. Appl. No. 15/728,421, filed Oct. 2017, Final Office Action, dated Nov. 1, 2018.

Bogrett, U.S. Appl. No. 15/728,421, filed Oct. 9, 2017, Office Action, dated Mar. 6, 2019.

Bogrett, U.S. Appl. No. 15/728,421, filed Oct. 9, 2017, Notice of Allowance, dated Apr. 11, 2019.

Bogrett, U.S. Appl. No. 15/728,421, filed Oct. 9, 2017, Interview Summary, filed Jan. 23, 2019.

Bogrett, U.S. Appl. No. 15/728,421, filed Oct. 9, 2017, Office Action, filed Apr. 10, 2018.

Bogrett, U.S. Appl. No. 15/419,051, filed Jan. 30, 2017, Notice of Allowance, dated Jun. 23, 2017.

* cited by examiner

HIGHLY AVAILABLE WEB-BASED DATABASE INTERFACE SYSTEM

BENEFIT CLAIM

This application claims the benefit under 35 U.S.C. § 120 as a continuation of application Ser. No. 17/566,813, filed Dec. 31, 2021, which is a continuation of application Ser. No. 16/551,538, filed Aug. 26, 2019, which is a continuation of application Ser. No. 15/728,421, filed Oct. 9, 2017, which is a continuation of application Ser. No. 15/419,051, filed Jan. 30, 2017, the entire contents of each of which is hereby incorporated by reference for all purposes as if fully set forth herein. The applicant hereby rescinds any disclaimer of subject matter occurring in the prosecution of any priority of which the benefit is claimed and advises the PTO that the claims in this application may be broader than in any application of which the benefit is claimed.

FIELD OF THE DISCLOSURE

The present disclosure relates to database management systems and, more particularly, to highly available database interface systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditionally a programmatic connection between a client computer system and a database management system (DBMS) is established using a streaming protocol. For example, the most basic streaming protocol is Transmission Control Protocol complemented by Internet Protocol (TCP/IP). In such a protocol, a client computer system and a server system, such as a DBMS, open up sockets at a particular port on respective network controllers and communicate via streams of data. For example, Open Database Connectivity (ODBC) and Java Database Connectivity (JDBC), which define application programming interface-based drivers for communicating with a DBMS, mainly use TCP streaming for the underlying communication with the DBMS.

However, a stream-based connection poses a great challenge for the computer infrastructure hosting a DBMS. For example, stream-based ODBC and JDBC drivers provide little flexibility to route the connection to different servers for load balancing. Once the streaming connection between an ODBC or a JDBC driver on a client computer system and a particular database server of DBMS is established, there is no easy way to re-direct or route this connection to another database server without interrupting the connection's persistency, which is required for stream-based connections. Accordingly, the computer infrastructure hosting the DBMS has to rely only on the DBMS's internal load balancing or fail-over algorithms to ensure resilience. However, the DBMS's internal fail-over may not be effective when a connection to the DBMS itself is interrupted. Furthermore, the DBMS's load balancing often hinges on the resource consumption of query executions internal to the DBMS, which may not provide effective resource distribution across all connections to the DBMS. A connection-level load balancing would be preferred in addition or alternative to the DBMS's own load balancing.

Furthermore, any network interruption may severely affect a stream-based connection utilized by ODBC or JDBC drivers. Stream-based communications heavily rely on the assumption that the continuity of connection(s) will be maintained until graceful disconnection by the participating client(s) or server(s). Accordingly, when a data stream is interrupted due to a network connection interruption or for any other reason, the client and the server of the interrupted connection have to cycle through a number of steps, particularly re-establishing the states of receipt and/or transmission of the data in the stream up to the interruption of the connection, and re-establishing the connection sockets to reconnect the client and server. That may be a complex task and require intricate state management on the server and/or client side.

Additionally, TCP/IP-based connections by ODBC/JDBC drivers utilize ports that are usually closed in most corporate firewalls and even by whole countries. Thus, a client computer system trying to connect from outside a corporate network using a TCP/IP-based connection may fail to establish communication with the server beyond the firewall. Similarly, a client computer within a corporate network may fail to connect to a server outside of the corporate network using a TCP/IP-based connection. A traditional workaround to allow ODBC/JDBC drivers to communicate across the firewalls is to add exceptions for the ODBC/JDBC ports. However, in addition to being a manual process, certain entities that maintain firewalls have strict policies that may not allow the opening of such ports.

DETAILED DESCRIPTION

Figure 1:
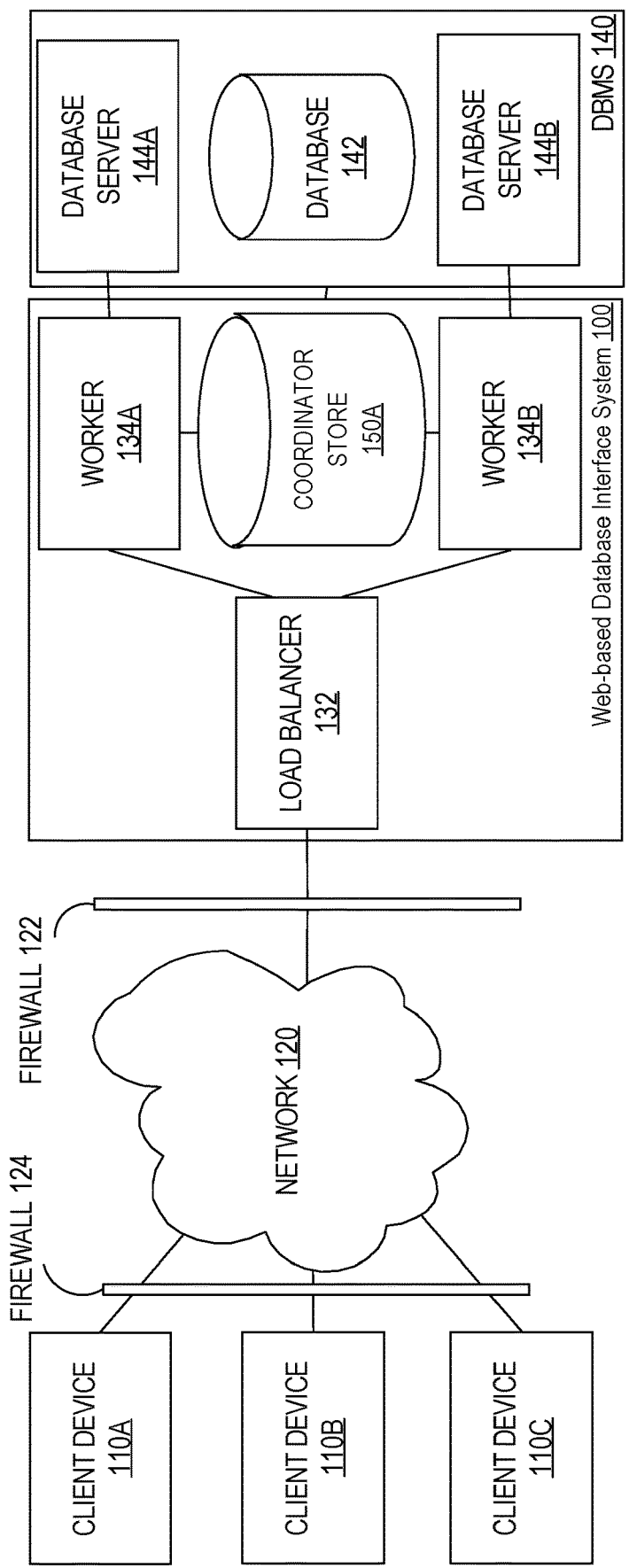
FIG. 1 and FIG. 2 are block diagrams that depict examples of computer system architecture that can be used to implement embodiments and that includes a web-based database interface system, in one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for establishing and operating a highly available web-based database interface system (WDIS) programmed for processing database requests that target one or more databases exported by a DBMS that is coupled to the system. In an embodiment, a client computer system establishes a web-based connection with a web server to communicate database requests to a coupled database management system (DBMS). The web-based protocol, in various embodiments, may be a hypertext transfer protocol (HTTP) or secure HTTP (HTTPS) and is a request/response-based protocol rather than a streaming protocol. Therefore, the web-based protocol communication is more resilient to connection interruptions and thus, provides a high-availability database interface. Each request/response can be treated as its own state, and thus if a response is unsuccessful because of the connection interruption, the response is re-tried until successful. Similarly, a client computer system may re-try an interrupted request if no acknowledgment has been received of its receipt by the receiving web server. With this approach, a client device's ODBC/JDBC driver does not need to maintain the state of a database request to ensure its resilience to a connection interruption but rather can rely on the web-based protocol for retries.

Further, with this approach, because firewalls open web-based communication ports, such as port 443 for HTTPS, a client web-based request may reach the receiving web server, even when the receiving web server or sending client device is behind a firewall, significantly improving the ease of deployment of a DBMS.

Additionally, the receiving web server may be a load-balancing web server that is coupled to multiple other web servers that can service web-based requests by the client computer system. The term "load-balancer," in an embodiment, refers to a web server that initially receives a client web-based request that contains one or more database instructions. The term "worker," in an embodiment, refers to a web server that a load balancer assigns and routes a client web-based request for processing. In an embodiment, a web server may be both a load-balancer and a worker and thus, may assign a client web-based database request to itself for processing.

Since the web-based protocol is a request/response-based protocol rather than a streaming protocol, a load balancer may easily identify and route the request to a worker based on a comparative or absolute workload of workers or based on a round-robin algorithm. Such routing has no effect on the connection with the client computer system while it improves the reliability of the connection and resource utilization of the system over stream-based communication protocols.

In an embodiment, a WDIS may maintain a request coordinator store to store information necessary for any of the workers to perform processing of any portion of database requests received in client web-based requests. A client web-based request may contain only a subset of database instructions necessary to complete a database request initiated by the client computer system. For example, one client web-based request may contain only a prepare command for a query of a database request to perform the query, while another client web-based request may contain the execute command for the database request, and yet another client web-based request may contain the fetch results instruction for the database request to execute the query. Each of these database instructions may be routed to a different worker. Thus, each of these different workers needs to access information about the execution of the other instructions that may have been (or is being) performed by other workers.

The term "request coordinator store" refers, in an embodiment, to a data storage storing information associated with database instructions received by workers. In one embodiment, the request coordinator store stores database request metadata, and resulting data generated by the coupled DBMS, in response to the execution of received database instructions. The metadata may contain the state of execution of a database instruction in the DBMS.

For example, a particular worker may receive a client web-based request to fetch a result of the database request to execute a query, while another worker has received and initiated the performance of database instructions to execute the query to generate the result. The other worker may store the state of the execution (success or failure of the executed instructions, number of currently returned rows) and the resulting (perhaps partial) result set of the execution in the request coordinator store. The particular worker may then query the information for the database request in the request coordinator store and based on the state, determine whether the particular worker can respond to the client web-based request with the requested result dataset.

In an embodiment, a web server of multiple web servers receives a first client web-based request that includes one or more first database instructions of a database request. The multiple web servers are configured to balance client web-based requests among one or more of the multiple web servers. One or more of the multiple web servers are coupled to a database management system that includes one or more database servers executing database instructions on one or more databases. Based on balancing client web-based requests among one or more of the multiple web servers, routing the first client web-based request that includes the one or more first database instructions of the database request to the first web server of the one or more multiple web servers coupled to the database management system. A request coordinator store coupled to one or more of the multiple web servers is queried to determine the state of the database request. Based at least in part on the state of the database request, the first web server requests the database management system to execute one or more first database instructions and update the state.

Example Computer System Architecture

FIG. 1 is a block diagram that depicts an example architecture of a computer system that includes a web-based database interface system, such as WDIS 100, in an embodiment. WDIS 100 is connected to client devices 110A-C through network 120. Although only three client devices 110A-C are depicted, other embodiments may include more or less than three. Similarly, other embodiments may include more or less database servers 144A-B and database 142 and workers 134 A-B.

Client devices 110A-C are configured to generate and transmit web requests with database instruction(s) that are sent over network 120 and directed to WDIS 100 and processed against one or more of database servers 144A-B of DBMS 140. One or more client applications might be hosted on each of the client devices 110A-C and may initiate the client web-based requests, for example by, invoking JDBC/ODBC drivers installed on the client devices 110A-C. Client device 110A-C may send the generated web-based requests over network 120 to WDIS 100.

Network 120 may be implemented by any medium or mechanism that provides for the exchange of data between client devices 110A-C and WDIS 100 of FIG. 1. Examples of a network include, without limitation, one or more of a Local Area Network (LAN), Wide Area Network (WAN), internetworks or the Internet, or one or more terrestrial, satellite or wireless links.

In an embodiment, WDIS 100 is behind a firewall 122. In such an embodiment, firewall 122 may allow some packets from clients to proceed while blocking others. Firewall 122 may be configured to allow web port-addressed packets, such as client web-based requests from client devices 110A-C, to proceed to be received by a web server beyond the firewall. Similarly, firewall 122 may be configured to all the web request responses from the web server to be received by client devices 110A-C Likewise, client devices 110A-C may be behind firewall 124, for example, because they are in a country with regulated internet access and/or because they are connected to a corporate private network with strict security settings. Such firewalls, like firewall 122, are generally configured to allow web port addressed packets, such as client web-based requests from client devices 110A-C, to proceed to be received by a web server beyond firewall 124, and similarly, web request responses to be received by client devices 110A-C through firewall 124.

In an embodiment, in addition to load balancer 132, WDIS 100 includes worker web servers 134A-B. Although only two workers 134A-B are depicted, other embodiments of the invention may include more than two. Load balancer 132 and each of workers 134A-B may execute using one or more computer systems that are coupled to DBMS 140 and to request coordinator store 150A through an internal network (not depicted in FIG. 1). In another embodiment, a worker and a database server, for example, worker 134A and database server 144A, are executing using the same one or more computer system. Thus, workers 134A-B and respective database server 144A-B may communicate over shared memory and other inter-process means of communication in such embodiments.

In an embodiment, database 142 of DBMS 140 can be targeted through multiple workers 134A-B. In other words, multiple workers 134A-B are configured to access one or more of DBMS 140. In one embodiment, each worker is dedicated to a particular database server and sends database instruction only to the particular database server which in turn executes the received database instruction on one or more databases of DBMS 140. For example, worker 134A would process client web-based requests and send one or more database instructions only to database server 144A which would execute one or more database instructions on database 142. Similarly, worker 134B may only send database instructions to database server 144B to execute on the same database 142. In another embodiment, database instructions are sent to DBMS 140 which determines programmatically using load balancing or fail-over algorithms which of the database servers 144A-B to route the request to be executed on database 142.

To coordinate the processing of database requests between workers 134A-B, coordinator store 150A stores data that is available to each of workers 134A-B, in an embodiment. Coordinator store 150A may be implemented as a distributed file system storing structured or semi-structured data that can be queried and written by any of the workers. In one embodiment, the coordinator store is stored in DBMS 140 in database 142. In another embodiment, coordinator store 150A is a network file share, and in yet another embodiment, the coordinator store is part of the local file system of workers 134A-B in which the content of coordinator store 150A is configured to be synchronized across workers 134A-B.

In an embodiment, client web-based requests targeting one of the databases of DBMS 140 that are interfaced with WDIS 100 are sent to load balancer 132 as opposed to any of workers 134A-B, each of which may be associated with different logical network addresses. Although depicted as a computing device that is separate from workers 134A-B, load balancer 132 may include the same functionality as one of workers 134A-B. Load balancer 132 is also different than each of workers 134A-B in that load balancer 132 routes a client request to a worker in WDIS 100 based on one or more criteria or factors. An example is using the current load of each worker.

In an embodiment, if load balancer 132 is unavailable or inoperative then another computing device in the WDIS 100 takes over the role of load balancer. The other computing device in WDIS 100 may be one of workers 134A-B or a separate "stand-by" computing device that assumes the role of load balancer 132.

Load balancer 132 is associated with a logical address, referred herein as a "WDIS address." The WDIS address may represent the hostname of WDIS 100, even though WDIS 100 includes multiple computing devices. Client devices 110A-C may obtain the network exact network address of the WDIS address of load balancer 132 through a DNS lookup request of the WDIS address hostname.

Client devices 110A-C treat the WDIS address as the logical address of a computing device that interfaces with database(s) of DBMS 140, such as the logical address of the computing device hosting load balancer 132. Examples of a logical address include an internet address (IP address), a media access control (MAC) address, a hostname and a fully qualified domain name (FQDN). Each database instruction from that client device is sent using that address as the destination, regardless of how many workers are currently in the WDIS, how many workers have been removed from the WDIS, and how many workers have been added to the WDIS. For example, ODBC or JDBC drivers of client devices 110A-C may be pre-configured with the hostname of the WDIS address. Once the network address of the WDIS is obtained by DNS lookup, client devices 110A-C may send database instructions to the network address of the WDIS address as the destination address. Network 120 routes the database instructions to load balancer 132, which is associated (e.g., in an address routing protocol (ARP) table) with the WDIS network address.

According to another embodiment, client devices can access individual workers of the WDIS and interact with those web servers, as opposed to directing all database instructions to a computing device hosting the load balancer for a WDIS, as described previously. Thus, the client devices can be aware of each WDIS worker's network address and can interact directly with the network address. A client device may determine the logical address of each worker through a DNS lookup, which resolves a hostname of a WDIS into a logical address for accessing a WDIS worker.

Figure 2:
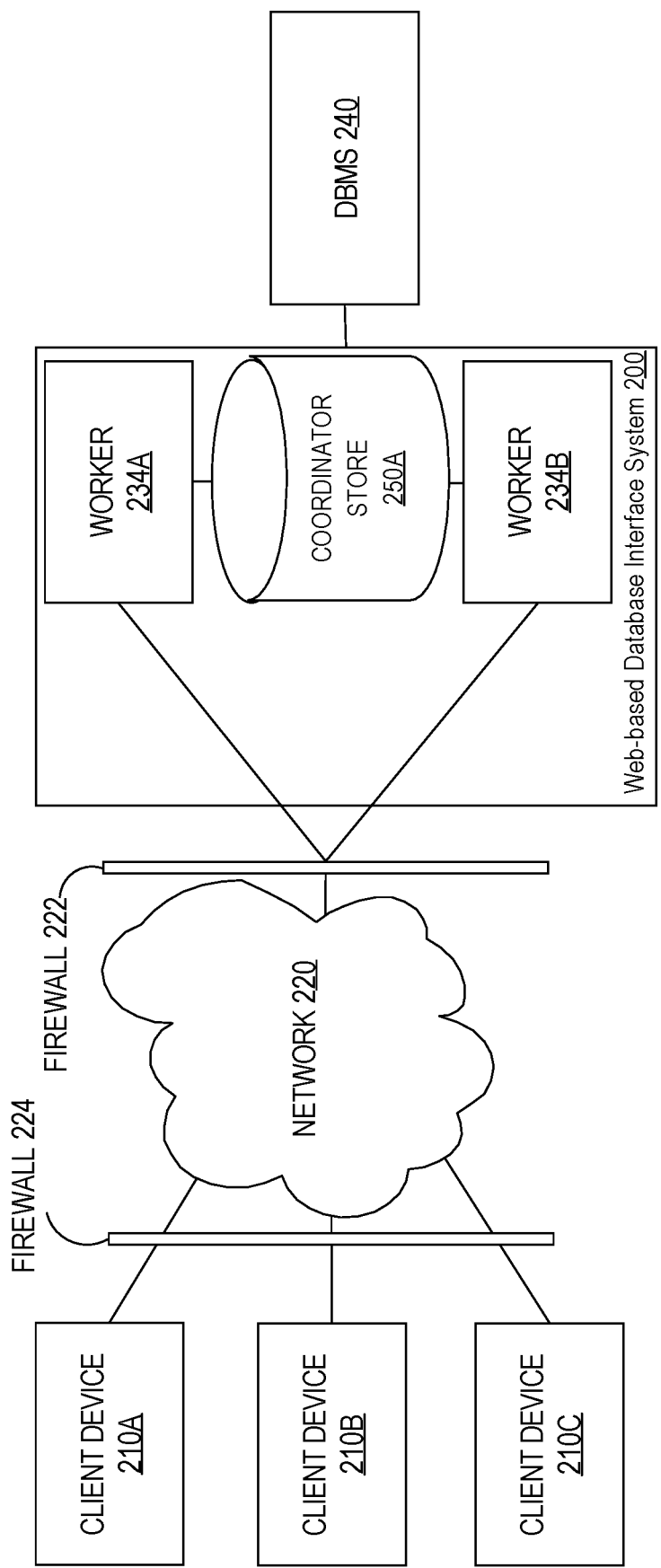

FIG. 2 is a block diagram that depicts an example of system architecture that includes a web-based database interface system, such as WDIS 200, in an embodiment. WDIS 200 is connected to client devices 210A-C through network 220. Although only three client devices 210A-C are depicted, other embodiments may include more or less than three. Similarly, other embodiments may include more or less workers 234 A-B.

Client devices 210A-C are programmed or configured to generate and transmit web requests with database instruction(s) that are sent over network 220 and directed to WDIS 200 and processed against one or more of database servers 244A-B of DBMS 240. One or more client applications might be hosted on each of client devices 210A-C and may initiate the client web-based requests, for example by, invoking JDBC/ODBC drivers installed on the client devices 210A-C. Client device 210A-C may send the generated web-based requests over network 120 to WDIS 100.

Network 220 may be implemented by any medium or mechanism that provides for the exchange of data between client devices 210A-C and WDIS 200 of FIG. 2. Examples of a network include, without limitation, a network such as a Local Area Network (LAN), Wide Area Network (WAN), Ethernet or the Internet, or one or more terrestrial, satellite, or wireless links.

In an embodiment, WDIS 200 is behind a firewall, such as firewall 222. In such an embodiment, the firewall may allow some packets from clients to proceed while blocking others. Firewall 222 may be configured to allow web port-addressed packets, such as client web-based requests from client devices 210A-C, to proceed to be received by a web server beyond firewall 222. Similarly, firewall 222 may be configured to all the web request responses from the web server to be received by client devices 210A-C. Likewise, client devices 210A-C may be behind firewall 224 which is configured to allow web port addressed packets, such as client web-based requests from client devices 210A-C, to proceed to be received by a web server beyond firewall 224. Similarly, web request responses are to be received by client devices 210A-C through firewall 224.

Although only two web servers, workers 234A-B, are depicted for WDIS 200, other embodiments may include more or less than two. Each of workers 234A-B is configured to process client web-based requests to extract one or more database instructions for DBMS 240.

Each worker of WDIS 200 is associated with the WDIS address of WDIS 200. The address is "virtual" because the assignment of the WDIS address to one worker may change. For example, worker 234A may be associated with the WDIS address at time 10. Later, at time 20, the WDIS address is assigned to worker 234B. Thus, at that point in time, client web-based requests to WDIS 200 with one or more database instructions would be routed to worker 234B, instead of worker 234A.

Similar to request coordinator store 150A, coordinator store 250A is a data store that is available to each worker, workers 234A-B, in an embodiment. Coordinator store 250A may be implemented as a distributed file system storing structured or semi-structured data that can be queried and written by any of workers, such as workers 234A-B. In one embodiment, the coordinator store is stored in a database of DBMS 240. In another embodiment, coordinator store 250A is a network file share, and in yet another embodiment, the coordinator store is part of the local file system of workers 234A-B in which the content of coordinator store 250A is configured to be synchronized across workers 234A-B.

Generating Client Web-Based Requests

An application on a client device may execute commands that cause request(s) for one or more database instructions to be executed on a DBMS. In an embodiment, a separate application program, such as an ODBC/JDBC driver, may be loaded for generating client web-based requests to a WDIS of the DBMS to perform the requested one or more database instructions.

Figure 3:
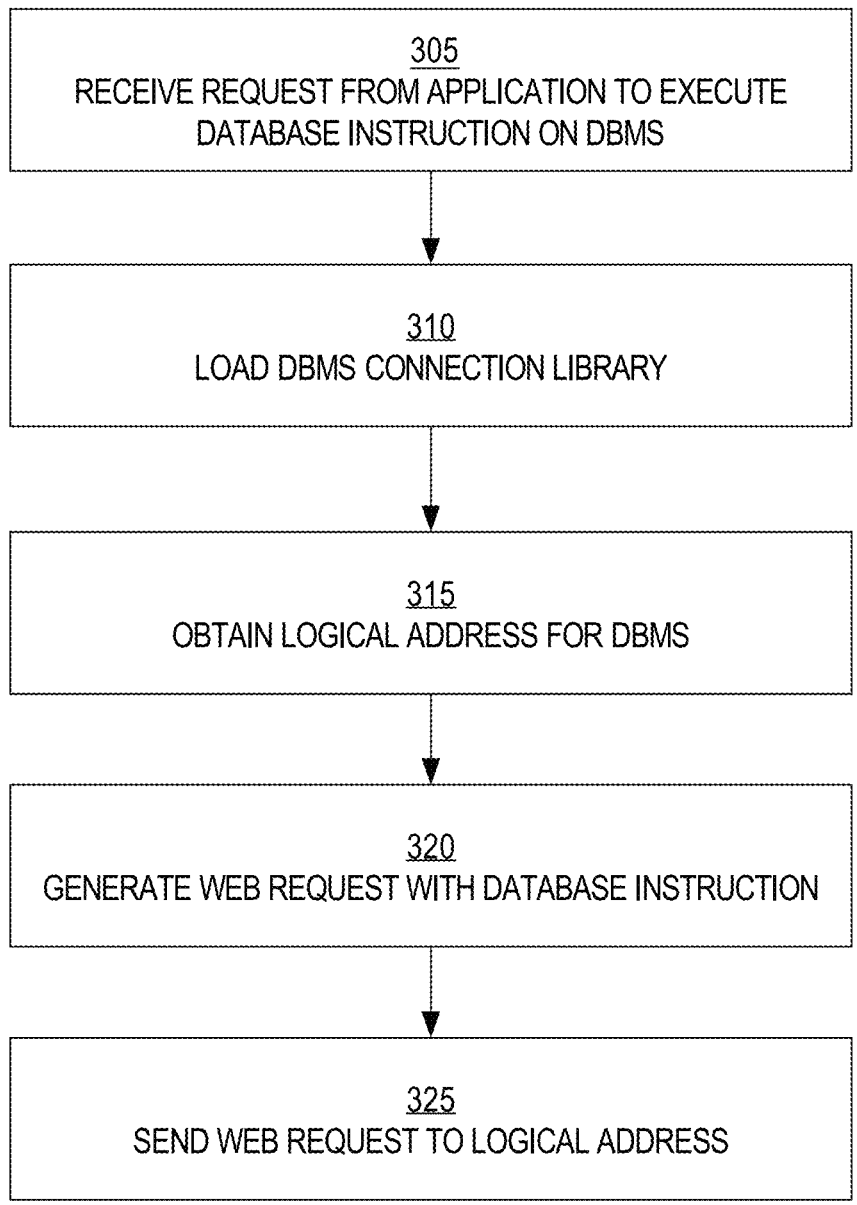
FIG. 3 is a flow diagram that depicts a process for generating and sending a client web-based request to execute a database instruction, in an embodiment.

FIG. 3 is a flow diagram depicting a process for generating and sending a client web-based request to execute a database instruction, in an embodiment. At block 305, a process receives a request from an application to execute a database instruction on DBMS. At block 310, the appropriate library for connecting with the DBMS is loaded by the client device to generate the client web-based request.

For example, a client application may request to execute a parametrized SQL query on a target database hosted by the DBMS. The application may leverage standard application program interfaces (APIs), such as ODBC or JDBC, for the request by calling the appropriate interface to prepare the DBMS for the execution of the parametrized SQL query. The call to the API results in loading the corresponding drivers configured to connect with the DBMS through a WDIS.

Continuing with FIG. 3, the process obtains a logical address for the target DBMS, the WDIS address, at block 315 and generates a client web-based request at block 320. To generate the client web-based request, the process may package the database instruction as a payload of the web-based request. In an embodiment, the payload is in a semi-structured format such as JSON or XML. The database instruction may be formatted to be included in the payload and/or any combination of the payload, the header containing the client web-based request method and/or the unique resource identifier (URI) of the client web-based request.

At block 325, the process may obtain the network address of the WDIS address of the DBMS by, for example, looking up the logical address of the DBMS in a domain name server (DNS). The process sends the generated web-based request to the network address.

Continuing with the example of the parametrized query, the loaded ODBC/JDBC driver may be pre-configured with the WDIS address of the target DBMS. In another example, the application may provide the WDIS address of the target DBMS with the API call for generating the client web-based request. The driver may use an HTTP or HTTPS protocol to send the database request. For example, the driver may select the appropriate HTTP method for requesting to prepare the parametrized query and may use the HTTP body for storing the parameterized query in a semi-structured format.

To communicate with the WDIS, the client device may translate the WDIS address of the DBMS into a network address by performing a DNS lookup. When establishing an HTTP(S) connection with the network address, the web server of the WDIS may challenge the client device to provide authentication for sending the client an HTTP-based request.

Authentication of Client Web-Based Requests

In an embodiment, before or while sending a client web-based requests for a DBMS, the client device authenticates with a web server of a WDIS that provides the interface for the DBMS. As part of the authentication process, the WDIS may determine the identity information of the client application on the client device that caused the request. The WDIS may use the identity information to enforce multi-tenancy of the DBMS and to track execution progress of database requests for different clients.

Figure 4:
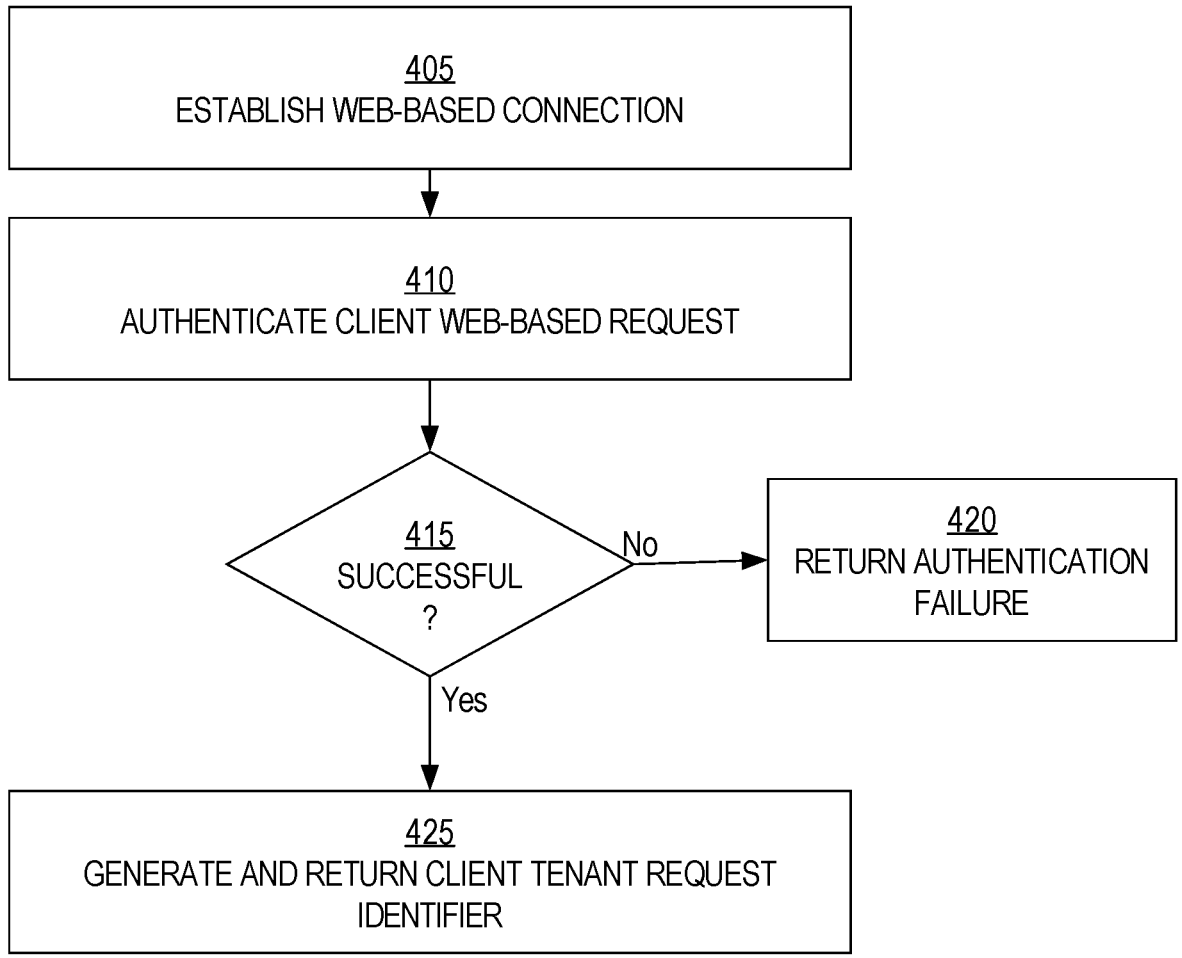
FIG. 4 is a flow diagram that depicts a process for authenticating a received client web-based request, in an embodiment.

FIG. 4 is a flow diagram that depicts a process for authenticating a client web-based request received by a WDIS, in an embodiment. As part of or before sending a client web-based request, the client device may attempt to establish a web-based connection with a web server of the WDIS at block 405. At block 410, in response to the client's request to establish a web-based connection, a process, for example, the receiving web server, may issue an authentication challenge to the client device. The client driver that initiated the web-based connection may provide its credentials in the form of credential data, in response to the challenge or as part of establishing the web-based connection with the web server at block 410. The credential data may include identity data identifying the identity of the client device or the client application that caused the web-based connection. The credential data may further include a secret associated with the identity information. At block 415, the credential data is verified by the process using an internal credential store to authenticate or a third-party authentication service such as Lightweight Directory Access Protocol (LDAP) or Active Directory® based services, in one or more embodiments.

In the event the authentication fails at block 415, the process returns authentication failure to the client at block 420. Upon a successful authentication at block 415, at block 425 the process generates a unique tenant request identifier. The term "tenant request identifier" refers to a unique identifier identifying a particular database request from a particular client application. In an embodiment, the tenant request identifier may be used for authorizing the client application for execution of database instructions on data managed by the DBMS.

In a related embodiment, the tenant request identifier is further used to track the execution of a database request that includes multiple database instruction received in different client web-based requests. To do so, at block 425, the generated tenant request identifier may be returned to the client driver to be used embedded with the subsequent client web-based requests that include the other database instruction for the initiated database request.

Routing a Client Web-Based Request

Figure 5:
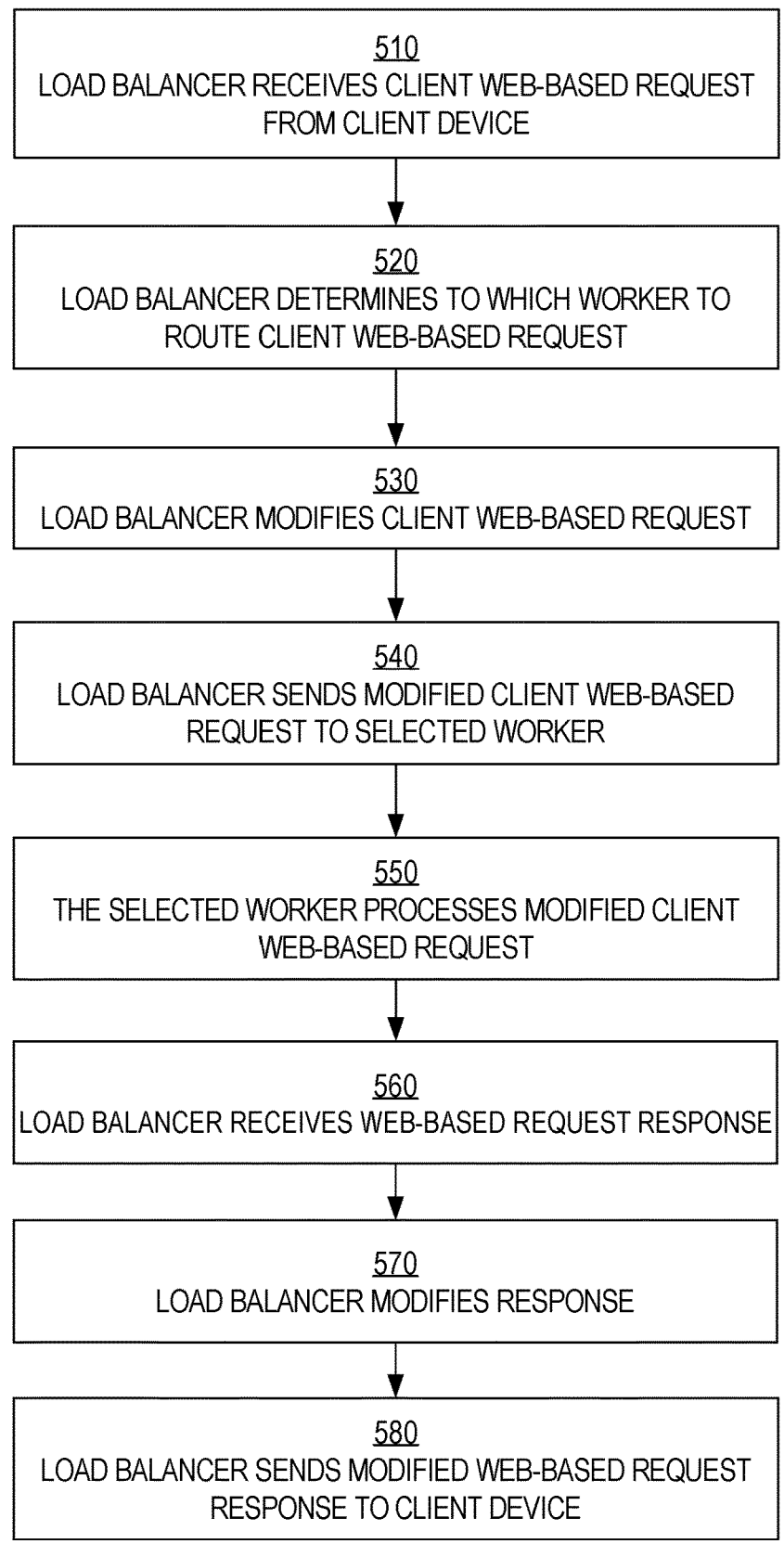
FIG. 5 is a flow diagram that depicts a process for processing a client web-based request, in an embodiment.

FIG. 5 is a flow diagram that depicts a process for processing a client web-based request, in an embodiment. At block 510, the load balancer of a WDIS receives a client web-based request from a client device. In an embodiment, in which no web server is solely dedicated to load-balancing web requests received by a WDIS (as depicted in FIG. 2), the worker that is assigned to the WDIS address is referred to as the load balancer. In such an embodiment, the load balancer may assign web requests to itself for processing.

At block 520, in response to receiving the client's web-based request, the load balancer determines which worker to route the client's web-based request. The load balancer selects a worker to route the client's web-based request based on one or more criteria or factors. Non-limiting examples of such criteria include whether a particular worker has already processed a client web-based request that is from the same client device/client driver, the current load of each of the workers, the type of client web-based request(s) each of the workers is processing and/or queuing, the type of client driver that initiated the client web-based request(s), and/or whether a computing device hosting the worker is experiencing or experienced critical failures. The current load of a worker may include one or more of the following: the number of web-based requests assigned to the worker, CPU usage of the worker, memory usage of the worker, I/O usage of the worker, the number of file systems exported by the worker, or the number of client web-based requests that are queued up by the worker.

Statistics about the current load may be received by the load balancer in multiple ways. For example, each of the workers may be configured to automatically and regularly (e.g., every 5 seconds) transmit such statistics to the load balancer. As another example, the load balancer receives statistics only after issuing requests for such statistics to each of the workers. Such requests may be sent in response to the load balancer receiving a new client web-based request. Additionally, such requests may be sent only in response to the load balancer receiving a client web-based request that is not part of any web-based request.

At block 530, prior to routing the client web-based request to the worker selected in block 520, the load balancer might alter the client web-based request such that the client web-based request appears, to the selected worker, to originate from the load balancer. For example, the load balancer replaces (1) the source address indicated in the client web-based request with an address (e.g., IP or MAC address) of the load balancer and (2) the destination address indicated in the client web-based request with an address associated with the selected worker. Such an alteration is performed so that the worker presumes that the load balancer is the "client" and the code for responding to client web-based requests does not need to change. Such an alteration takes advantage of routing tables and standard protocols. The client sees the request as coming from the load balancer and the worker sees the request as coming from the load balancer. This allows the packet to be changed from the public to the private network (which may be orders of magnitude faster), as well as to provide for the masquerading necessary to "fool" the client. Such an arrangement also provides for a level of security that is not there if all requests were public.

At block 540, the load balancer sends the (modified) client web-based request to the selected worker. At this point, the client's web-based request is considered to be in the "private network."

Processing Client Web-Based Database Requests

Continuing with FIG. 5, at block 550, the selected worker receives and processes the client web-based request and generates a web-based request response.

Figure 6:
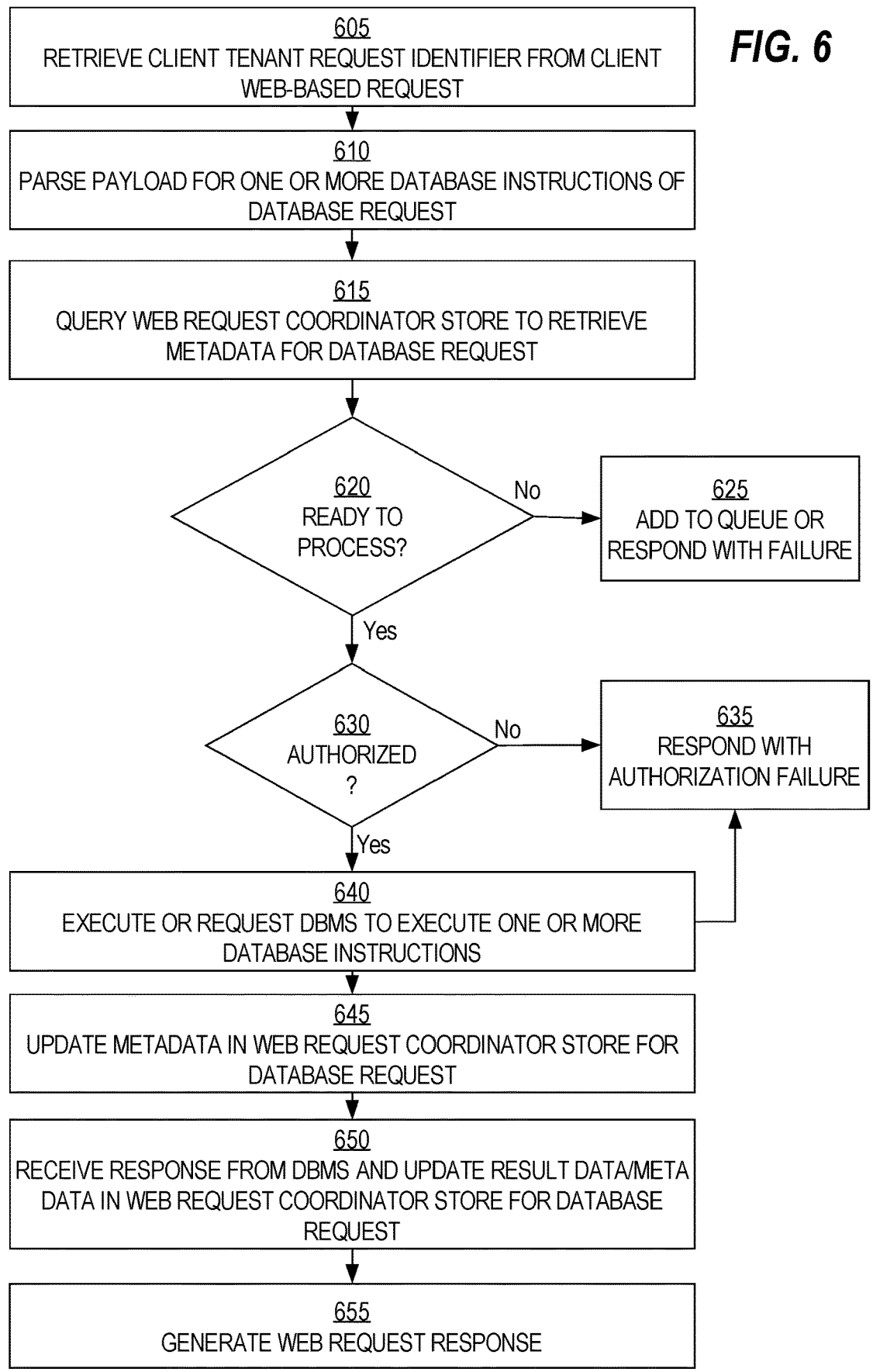
FIG. 6 is a flow diagram depicting a process for processing a client web-based request and generating a web-based request response, in an embodiment.

FIG. 6 is a flow diagram depicting a process for processing a client web-based request and generating a web-based request response, in an embodiment. At block 605, the process, such as the selected worker web server, retrieves the tenant request identifier from the received client-web-based request. The tenant request identifier may be included in the URI of the web-based request, or in header properties of the web request or may be embedded in the payload. If the received client web-based request contains no tenant request identifier, then a new one is generated for the request and is returned to the client driver as part of the response to the client web-based request.

At block 610, the process parses the payload to retrieve one or more database instructions for DBMS to execute. The one or more database instructions may be arranged in a pre-defined format. For example, the payload may be in a semi-structured data format such as JSON or XML. The process may use a data schema identified by the payload or pre-configured for parsing payloads to extract the one or more database instructions from the payload.

At block 615, the process queries the request coordinator store of the WDIS to retrieve database request metadata. The term "database request metadata" refers herein to the data describing the state of the database request for which the process is processing the newly received one or more database instructions in the current client web-based request. Examples of the database request metadata include the state of the database request, such as the status of already processed database instruction(s) for the database request; authorization/permissions for the database request; metadata of the current result set for the database request; the tenant request identifier for the database request; information about the client driver and/or client device that have provided one or more client web-based requests for the database request; and time stamp information for receiving and/or processing the one or more web-based requests.

In an embodiment, at block 615, the process queries and identifies such database request metadata using the tenant request identifier of the received client-web-based request. In another embodiment, the one or more database instructions for the database request may contain identifying information that can be used to query the metadata for the database request. In yet another embodiment, such information may be included in the target URI, the payload or the header of the received client web-based request.

At block 620, the process determines whether the one or more database instructions in the client web-based request can be successfully executed on the coupled DBMS. Because the one or more database instructions received in the client web-based request may be dependent on execution (or at least partial execution) of another database instruction of the same database request, the worker of WDIS has to ensure that the state of the dependent database instructions qualifies for requesting the execution of one or more database instructions in the received client web-based request. For example, the worker may determine whether all dependent instructions have been successfully executed, partially executed, currently being executed, or have failed.

Continuing with the above parametrized query example, to process the database request to execute a parametrized query on a DBMS, the ODBC/JDBC driver of the client device may have first sent the prepare database instruction in the first client web-based request. This first client web-based request may have been followed by the second, separate, client web-based request to execute the parametrized query with parameters. For example, the second client web-based request may include an "EXECUTE" database instruction for the parametrized query and the parameter data necessary to perform "EXECUTE" database instruction on the DBMS, while the first client web-based request may include an "PREPARE" database instruction specifying the parametrized query.

Accordingly, these two example client web-based request are inter-dependent and would need to be sequentially processed to succeed. However, the first client web-based request may have been received by the first worker of a WDIS of the targeted DBMS, while the second client web-based request is received by the second worker of the WDIS. Because different workers are processing the sequential instructions, unless the first worker and the second worker coordinate the database instructions for execution, the workers may request the DBMS to execute database instructions out-of-order thereby causing a failure of the database request.

In an embodiment, the process uses the retrieved database request metadata to determine whether to request the DBMS to execute the received one or more database instructions. The metadata may contain the state of the database request and may include individual statuses of the processed database instructions.

Accordingly, continuing with the example of the parametrized query, the second worker queries the request coordinator store of the WDIS using the tenant request identifier and/or other information extracted from the second client web-based request. The second worker examines the database request metadata to identify the status of the previous database instructions, such as the "PREPARE" database instruction. Based on the state of the "PREPARE" database instruction as identified in the metadata, the second server determines whether to request the DBMS to perform the newly received "EXECUTE" instruction.

At block 620, if the process determines that one or more dependent database instructions have not been completed, the process transitions to block 625, in an embodiment. At block 625, the process may store the database instructions associated with the tenant request identifier in the request coordinator store to be processed later. Alternatively, the process may generate a web-based response to the client's web-based request with the information on the failure to perform the received one or more instructions and send it to the client's device at block 625. The client device may then retry the client web-based request with the "EXECUTE" database instruction later (e.g. once it receives the status for the "PREPARE" client web-based request).

Alternatively, at block 620, if the process determines that the state for the database request denotes a partial execution of the one or more dependent database instructions, the process may further examine the received one or more database instructions to determine whether such partial execution would suffice. Based on the examination, the process may determine that the execution of the received one or more database instructions would be expected to succeed, even if the previous dependent database instructions have not been fully performed.

For example, continuing with the sample execution of the parametrized query, the client ODBC/JDBC driver may issue a "FETCH FIRST 100 ROWS" database instruction. The database instruction requests the DBMS to return the first 100 rows of the result set from performing the previously sent "EXECUTE" database instruction. Upon the receipt of the HTTP(S)-based request for the "FETCH" database instruction, the load balancer of the WDIS assigns the request to another worker, the third worker, to process. The third worker queries the request coordinator store to determine the state of the database request to execute the parametrized query. The metadata returned may indicate that the "EXECUTE" instruction is still in progress.

The metadata may further indicate that the second worker has already received and stored in the request coordinator store the first thousand rows of the result set that the DBMS generated in response to the "EXECUTE" database instruction. While the second web server is still receiving the rest of the result set from the DBMS, the third server accesses the first 100 rows of the result set from the request coordinator store as indicated by the metadata. The third server may package the result set into an HTTP(S) response and send the response to the requesting ODBC/JDBC driver on the client device.

Continuing with FIG. 6, at block 620, if the process determines that one or more received database instructions may succeed, the process proceeds to block 630 to request authorization for performing the received database instructions.

In an embodiment, a WDIS may use authorization to enforce the tenancy in the coupled DBMS so as to ensure that different tenants can execute database instruction only on database objects explicitly assigned to the respective tenants.

In one embodiment, database object/action authorization information is stored in the database request metadata which itself is retrieved at block 615 based on the tenant request identifier as described above. By matching the received database instructions and/or the database objects targeted by the received database instructions with those in the metadata, the process may determine whether the received one or more database instructions are authorized for performance on the DBMS. In another embodiment, database object/action authorization information is stored in the DBMS. The worker may request the DBMS to provide the database object/action authorization information for the received one or more database instructions/database objects. The received database object/action authorization information may be similarly used for the authorization. If unauthorized, the process returns an authorization failure response to the received client web-based request at block 635. Otherwise, if authorized, the process proceeds to block 640 to request the DBMS to execute the received one or more database instructions.

In yet another embodiment, the authorization is enforced on the access of database objects and/or result set. The DBMS has partitioned its database objects to create a distinct set of database objects that are authorized for each tenant. Accordingly, rather than performing authorization at block 630, the process may request the DBMS to perform the authorization by requesting the DBMS to perform the received one or more database instructions at block 640. The process may provide the DBMS with the acquired identity information at the authentication for the DBMS to use internally to authorize the execution of the database instructions on the targeted one or more database objects. Similarly, any result set returned by the DBMS to be stored on the request coordinator store may also be partitioned based on the authorization. Thus, if a performance of database instruction causes to access to a particular result set on the coordinator store, the access may fail or succeed based on the authorization. If unauthorized, the process returns authorization failure response to the received client web-based request at block 635.

At block 640, if not already executed for the authorization, the process executes or requests to the DBMS to execute the received one or more database instructions. The process may further update the corresponding database request metadata on the request coordinator store to indicate the new state of execution being in progress, at block 645. At block 640, the process may receive the result data of the execution. The process may update the corresponding metadata to indicate the new state at block 650. In case the result data contains a result set that was generated in response to the execution, the process stores the result set in the request coordinator store, in an embodiment.

At block 655, the process may generate a web-based response based on the result data of the execution and send the web-based response in response to the received client web-based request. In an embodiment, the web-based response contains the result in its payload formatted using a semi-structured data format, such as JSON or XML. In an embodiment, in which the client web-based request is formatted as an HTTP(S) method request, the web-based response is in the form of an HTTP(S) method response. The worker may send the generated web-based response to the load balancer for the load balancer to forward the web-based response to the client device according to the techniques described herein.

Continuing with FIG. 5, at block 560, the load balancer of the WDIS receives the web-based request response from the selected worker. At block 570, the load balancer may modify the web request response such that the web request response appears, to the client device that sent the client web-based request, to be from the load balancer instead of from the selected worker. For example, the load balancer replaces (1) the source address indicated in the web request response with a WDIS address associated with the load balancer and (2) the destination address indicated in the web request response with an address associated with the client device that sent the client web-based request received in block 510.

At block 580, the load balancer sends the (modified) web request response to the client device that sent the client web-based request.

Load Balancing

In an embodiment, one or more load balancing techniques are performed on workers. Load balancing of a WDIS involves assigning web-based requests to each of the workers of the WDIS such that each of the workers is assigned an equal number of web-based requests (e.g., two web-based requests each) or such that no worker has two or more web-based requests assigned to it than are assigned to any other worker (e.g., two web-based requests to worker and three web-based requests to another worker). In one embodiment, the load balancer may to use a round-robin technique of sequentially assigning workers client web-based requests as they are received by the load balancer.

Load balancing of WDIS may occur in response to one or more events. Non-limiting examples of such events include the removal of a worker from WDIS and an addition of a worker to WDIS.

Non-limiting examples of load balancing criteria include the number of web-based requests assigned to each of the workers, the number of client web-based request each of the workers is currently processing and/or queuing, and an estimated (or actual) cost of data from one worker to another worker.

For example, if a worker is assigned five web-based requests while another worker is not assigned any web-based requests (or has not been assigned web requests for a certain amount of time), then one or more of the five web-based requests assigned to the worker are assigned to the other worker.

Performance Tuning

In an embodiment, the load balancer of a WDIS applies one or more performance-tuning techniques when determining how to route a client's web-based request. Load balancing and performance tuning are related. While load balancing involves distributing load (reflected by the number of web-based requests assigned to each worker) evenly among workers in a WDIS, performance tuning is generally concerned with immediate performance and may involve considering additional factors, such as the type of client driver that initiated the client web-based request. Thus, performance tuning tends to be more complicated than load balancing.

Performance tuning may be accomplished using software that monitors certain factors. Performance tuning software executing on the load balancer (and/or one or more of workers) determines how to re-assign web-based requests based on certain heuristics. An example of a heuristic is if the Central Processing Unit usage on a particular worker reaches 90%, then at least one web-based request assigned to the particular worker is re-assigned to another worker. Alternatively, performance tuning software implements more sophisticated logic, such as a probabilistic model, examples of which include Markov networks and Bayesian networks. Such a probabilistic model accepts multiple inputs, such as I/O throughput, memory usage, CPU usage), and network usage. Based on the probabilistic model, the performance tuning software might determine if a worker is likely to have a problem serving additional web-based requests and might spread out the remaining web-based requests as well as re-assign currently running web-based requests to better distribute the load among the entire WDIS.

For example, a worker of WDIS is assigned two web-based requests: request1 and request2. Request1 is to fetch a large result set. Processing request1 heavily consumer I/O, which is taxing the storage system and memory resources. One or more web servers in the WDIS (e.g., load balancer) might detect this and move request2 to another worker (even though the other worker might already be assigned two web-based requests) so that the worker has more computing resources, and the client that initiated request2 would not continue to see performance degradation.

Failover and Connection Failures

In an embodiment, if a load balancer of a WDIS fails, crashes, or is taken down, then another web server assumes the role of the load balancer. This other web server is referred to herein as a "backup load balancer." The backup load balancer may be a worker or may be a "standby" computer system whose purpose is to perform the functionality of a load balancer if the load balancer is removed. After the backup load balancer assumes the role of a load balancer, then subsequent client web-based requests that targeted the load balancer are sent to the backup load balancer.

The backup load balancer may accomplish this task by causing a mapping between the WDIS address and the address of the load balancer to be updated. This mapping may be stored in an ARP (i.e., Address Resolution Protocol) table in a switch or the load balancer outside of WDIS. The mapping is updated by causing the address of the previous load balancer to be replaced with the address of the backup load balancer. In this way, any future client web-based requests directed to the WDIS as the destination will be routed to the backup load balancer.

Such a failover of a load balancer to a backup load balancer as well as other network interruptions may affect the connectivity of the load balancer with one or more client devices communicating to the DBMS through the WDIS. In an embodiment, upon attempting to send a web-based communication, either a load balancer of a WDIS or a client device may detect a network connection failure. For example, a client device may send a client web-based request to the WDIS address but in response, receive a network connection failure. The client device may re-try sending the client web-based request thereby causing the connection with the WDIS to be re-established. Similarly, if a load-balancer sends a web-based request response which fails due to a network failure, the load balancer may attempt to re-send the response and thus, re-establish the connection. The number of attempts and the frequency of attempts for re-sending failed web-based communication may be configurable.

Using such a web-based discrete request-response protocol between a client device and a WDIS improves the resiliency of the communication toward network interruptions. Either side of the communication either has received a web-based request/response or has failed to in which case a new attempt is made until successful. The streaming protocols lack any discrete attempts and any network interruption can interrupt the stream at any point in the communication. Leveraging the web-based request/response protocol, the system has small to no risk of ending up in a corrupt intermediate state from which it may not recover.

Web-Based Database Request—Functional Overview

Figure 7:
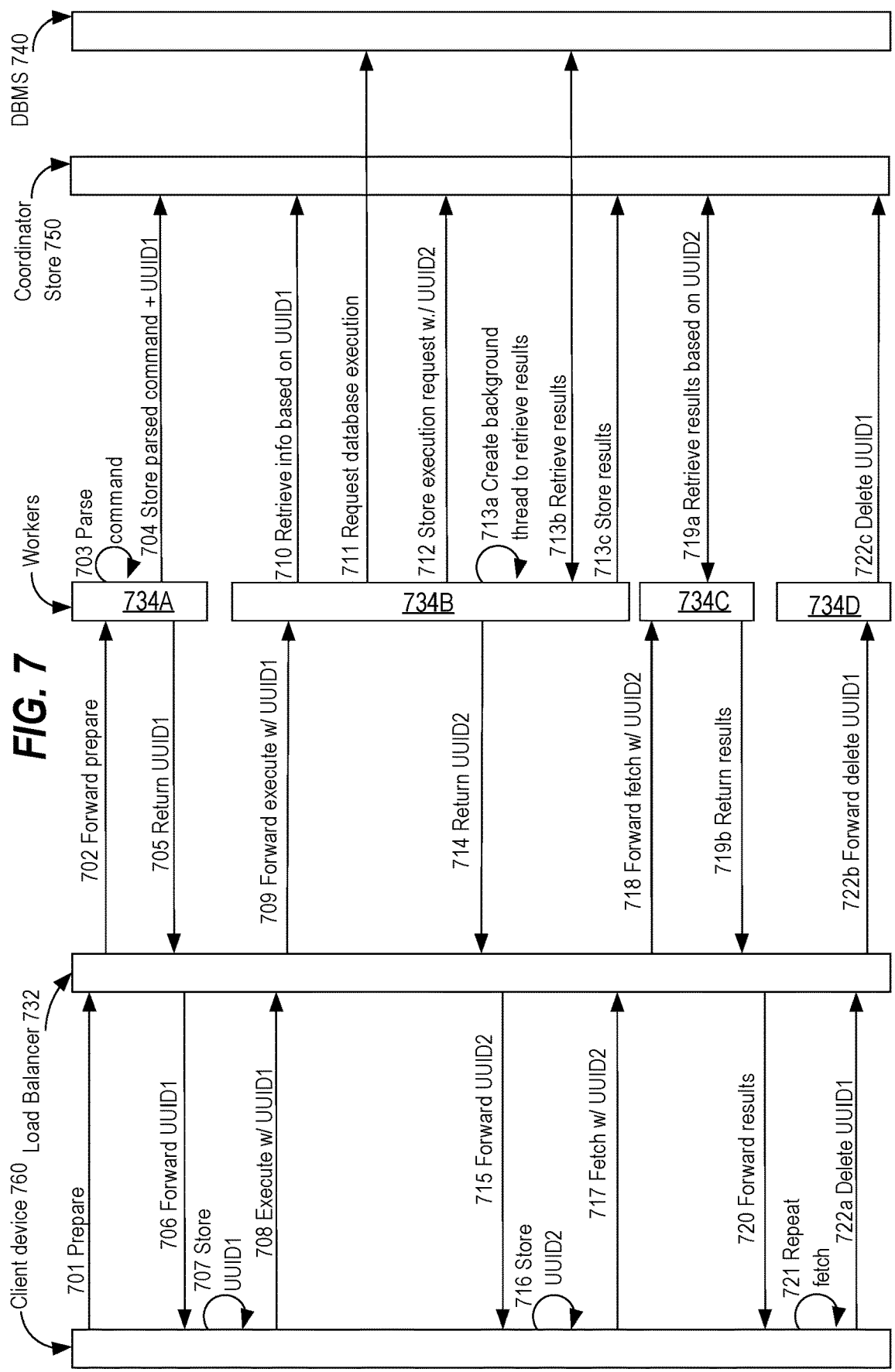
FIG. 7 is a flow diagram that depicts processing and generating results in response to a client web-based database request, in an embodiment.

FIG. 7 is a flow diagram that depicts processing and generating results in response to a client web-based database request, in an embodiment. An application, executing on client device 760, may load a client program, such as an ODBC or JDBC driver, and request the client program to execute one or more database instructions. At step 701, a process at the client device 760 generates a web-based request with a prepare command for such database instructions. Once generated, the process sends the web-based request to a WDIS address of the requested DBMS, DBMS 740. At step 702, a process at load balancer 732, servicing web-based requests for the WDIS address, receives the web-based request sent by client device 760. Using load balancing techniques discussed herein, the process at load balancer 732 forwards the web-based request to worker 734A. At step 703, a process at worker 734A parses the web-based request and the prepare command within the web-based request. The process generates a unique identifier, UUID1, for the prepare command and stores the parsed prepare command in association with the generated unique identifier, UUID1, in web request coordinator store 750 at step 704.

Additionally or alternatively, worker 734A may connect to DBMS 740 and request the execution of the prepare command by DBMS 740. Worker 734A may store the response of such an execution by DBMS 740 in web request coordinator store 750 and/or return the response from DBMS 740 in a web-based response to client device 760 through load balancer 732.

At step 705, the process at worker 734A returns the unique identifier UUID1 to load balancer 732, which then forwards the unique identifier UUID1 to client device 760 at step 706. At step 707, a process of the client program at client device 760 stores received unique identifier UUID1 to be used in future database requests related to the prepare command.

At step 708, a process of the client program at client device 760 receives from the application an execute command for the previously sent prepare command. The database instructions for the execute command request include any information necessary to instantiate a database execution request to DBMS 740 that is based on the previously sent prepare command. Non-limiting examples of such information include: parameter data, parameter information, transactional information, asynchronous handling information, processing information, processing limits, timeout settings, error handling directives, commit and rollback handling information or directives, result set format, result set limitations, filtering information, data source information, data target information. At step 708, the process at the client device 760 generates a web-based request for the execute command that includes previously stored unique identifier UUID1 and sends the web-based request to the WDIS address.

At step 709, a process at load balancer 732, servicing web-based requests for the WDIS address, receives the web-based request. Using load balancing techniques discussed herein, the process at load balancer 732 forwards the web-based request to worker 734B. At step 710, a process at worker 734B retrieves from web request coordinator store 750 the information stored in web request coordinator store 750 based on received unique identifier UUID1. At step 711, the process at worker 734B establishes a connection with a database server of DBMS 740 and submits the database instructions associated with unique identifier UUID1 to the database server for execution. At step 712, the process at worker 734B generates a unique identifier associated with the database execution request, UUID2, and creates a new record in web request coordinator store 750 indicating the database execution request associated with UUID2.

At step 713*a*, the process creates a background thread that reads, at step 713*b*, the result data set(s) and status(es) returned in response to the database execution at step 711. At step 713c, the background thread associates the received information with unique identifier UUID2 and stores the received information in web request coordinator store 750 store in association with unique identifier UUID2. Non-limiting examples of information received and stored in web request coordinator store 750 in response to the database execution request include the corresponding unique identifier, UUID1, for the prepare command, result data set(s), statistics about performance of the request, status information about error(s) and warning(s), ordering of the result data sets, data source information, target data source information, transactional information, timeout information, parameter data information of the prepare command, error handling instructions, processing information and any other information that can be used by any worker to retrieve incremental information generated in response to the database execution request. In an embodiment, the background thread incrementally stores in web request coordinator store 750 any information necessary for a latter received asynchronous fetch command to be able to query the information based on UUID1 and/or UUID2. Such asynchronous fetch command request(s) may be caused by web-based requests described for step 717.

At step 714, after the process generates a unique identifier UUID2 to track the results of the database execution request, the process returns unique identifier UUID2 to load balancer 732, which forwards unique identifier UUID2 to client device 760 at step 715. The client device 760 stores unique identifier UUID2 to retrieve for future fetch commands at step 716.

At step 717, the client application program may receive a request to fetch results for the previously sent database execution command. A process at client device 760 generates a web-based request for the fetch command that includes previously stored unique identifier UUID2 and sends the web-based request to the WDIS address. The fetch command may include any information necessary to retrieve at least a portion of the results generated from the database execution request. Non-limiting examples of information included in the fetch command include the start row of a result data set, the end row of a result data set, a block size of a result data set, starting primary key of a result data set, ending primary key of a result data set, ordering information, filtering information, data source descriptions, and data target descriptions.

At step 718, a process at load balancer 732, servicing web-based requests for the WDIS address, receives the web-based request. Using load balancing techniques discussed herein, the process at load balancer 732 forwards the web-based request to worker 734C. At step 719a, a process at worker 734C retrieves the result information stored in web request coordinator store 750 based on unique identifier UUID2 and/or the associated unique identifier UUID1. The process at worker 734C packages the requested result information into a web request response and returns this information to load balancer 732 at step 719b. At step 720, load balancer 732 forwards the returned information from worker 734C to client device 760. At step 721, a process at client device 760 may repeat step 717 to 720 until the result information retrieved satisfies client device 760.

After fetching results or any other event indicating completeness or indifference to the original request, client device 760 may determine to end the database request. At step 722a, a process at client device 760 may send to the WDIS address a web-based request to delete the prepared state with the related information. At step 722b, a process at load balancer 732, servicing web-based requests for the WDIS address, receives the web-based request. Using load balancing techniques discussed herein, the process at load balancer 732 forwards the web-based request to worker 734D. At step 722c, a process at worker 734D deletes the information stored in web request coordinator store 750 that is associated with unique identifier UUID1.

Although, in one or more embodiments of FIG. 7, a single client is depicted performing the one or more steps described above, in actual implementation multiple client devices may perform the steps simultaneously. Further, although in one or more embodiments of FIG. 7, techniques are described for the prepare-execute-fetch database request cycle, the same techniques are applicable to any other database request. Additionally or alternatively, workers 734A-D are depicted in FIG. 7 as performing one or more steps of FIG. 7, the same or different worker of workers 734A-D may perform the steps described for the different workers. Further, in some embodiments, DBMS 740 may include one or more of: load balancer 732, workers 734A-D, and web request coordinator store 750.

Database Management Systems

A database management system (DBMS), such as a DBMS coupled with a WDIS, manages a database. A DBMS may comprise one or more database servers. A database comprises database data and a database dictionary that is stored on a persistent memory mechanism, such as a set of hard disks. Database data may be stored in one or more data containers. Each container contains records. The data within each record is organized into one or more fields. In relational DBMS s, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of nodes that may store one or more tables. The DBMS may manage tables stored on the cluster of nodes similar to managing tables stored on persistent storage.

Users interact with a database server of a DBMS by submitting to the database server commands that cause the database server to perform operations on data 'stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language and may be used in conjunction with other database query languages and constructs.

A client may issue a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
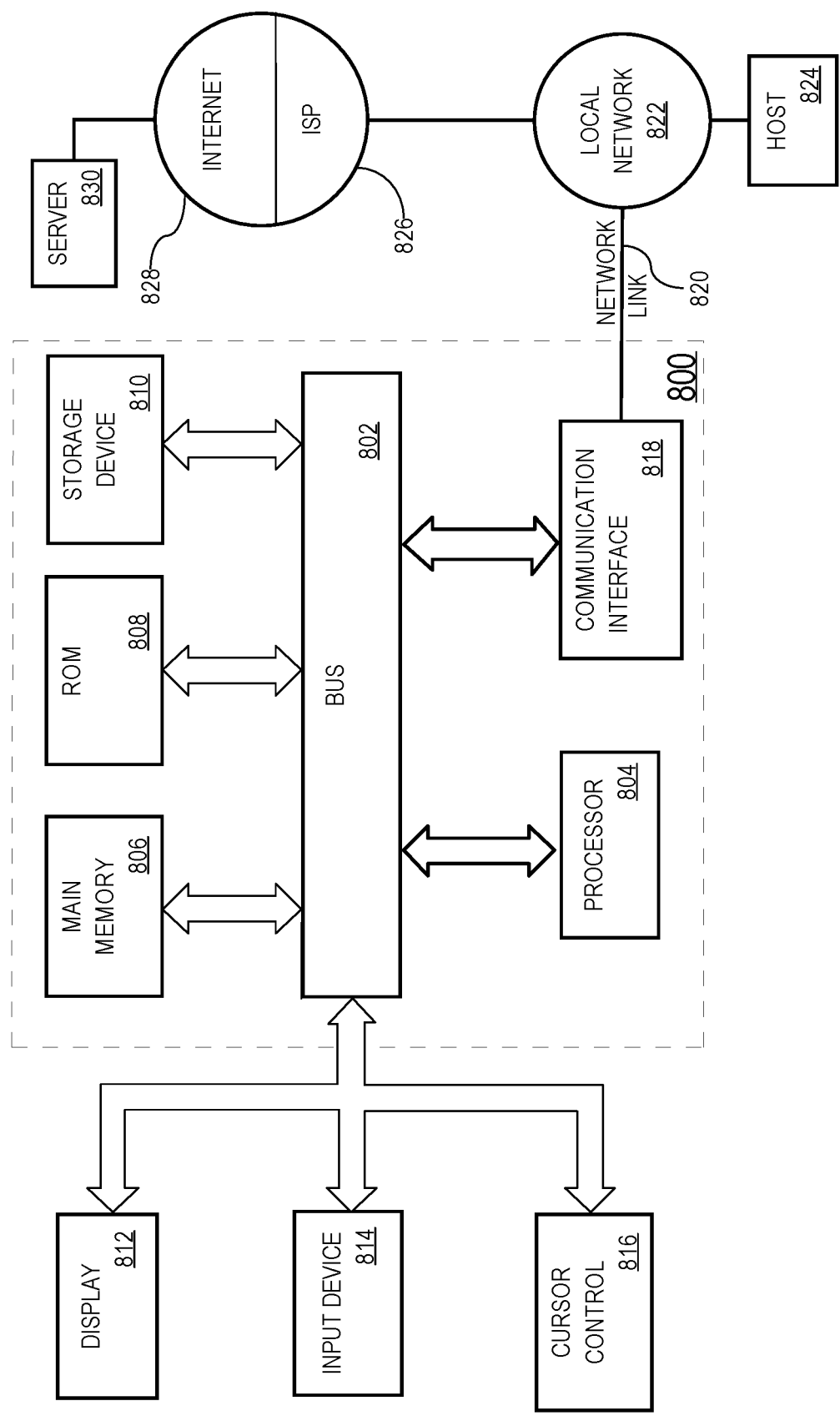
FIG. 8 is a block diagram that illustrates a computer system upon which an embodiment of the invention may be implemented.

For example, FIG. 8 is a block diagram that illustrates a computer system 800 upon which an embodiment of the approach may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

What is claimed is:

1. A computer-implemented method executed using a computer system and comprising:
   receiving, from a client device, a request to establish a web-based connection with a web server, wherein the request to establish a web-based connection with a web server is associated with credential data of the client device, and wherein the web server is associated with the computer system and a database management system;
   in response to receiving the request to establish the web-based connection, performing authentication of the client device based on the credential data of the client device;
   in response to the authentication, generating a unique tenant request identifier;
   generating a client request comprising a database request, the database request comprising one or more database instructions, wherein the database request is associated with the unique tenant request identifier and a logical address for the database management system, wherein the unique tenant request identifier identifies the database request;
   establishing a network connection with a web-protocol port of the web server using the logical address for the database management system;
   sending, over the network connection, the client request to the logical address of the database management system;
   authorizing, using the unique tenant request identifier, execution by the database management system of at least one database instruction of the one or more database instructions of the database request; and
   tracking a progress of execution of the database request.

2. The computer-implemented method of claim 1, further comprising querying a request coordinator store to determine a state of the client request in response to sending the client request to the logical address of the database management system, wherein the state of the client request comprises an execution state of the at least one database instruction of the one or more database instructions of the database request.

3. The computer-implemented method of claim 2, further comprising, in response to querying the request coordinator store to determine the state of the client request, requesting, based at least in part on the state of the client request, the database management system to execute at least one other database instruction of the one or more database instructions of the database request; and updating the state of the client request at the request coordinator store.

4. The computer-implemented method of claim 2, further comprising, in response to sending the client request, receiving a request response including result data that is obtained from execution of the at least one database instruction of the one or more database instructions of the database request.

5. The computer-implemented method of claim 4, the request response including information on a failure to execute the at least one database instruction of the one or more database instructions of the database request, the information on the failure to execute being based on the state of the client request.

6. The computer-implemented method of claim 1, further comprising:
   determining the credential data of the client device or a client application of the client device that caused the client request for the web-based connection, wherein the credential data comprises identity information identifying the client device or the client application and a secret associated with the identity information;
   using the credential data to enforce multi-tenancy of the database management system, wherein the database management system is associated with database requests of one or more other client devices; and
   tracking a progress of execution of the database requests of the one or more other client devices.

7. The computer-implemented method of claim 1, further comprising verifying the credential data using a credential store associated with the computer system.

8. The computer-implemented method of claim 1, wherein the tracking of the progress of the execution of the database request comprises sending the unique tenant request identifier to the client device.

9. The computer-implemented method of claim 2, further comprising retrieving at least a portion of a result set of the client request from the database management system; and
storing at least the portion of the result set of the client request in the request coordinator store in association with the unique tenant request identifier.

10. The computer-implemented method of claim 1, wherein after the sending, over the network connection, of the client request to the logical address of the database management system, a source address of the client request is altered to a load balancer address and the logical address is altered to a worker web server address, the worker web server address associated with a worker web server that is to process the client request and send the at least one database instruction of the one or more database instructions of the database request to a particular database server of the database management system for the execution of the at least one database instruction of the one or more database instructions.

11. One or more computer-readable non-transitory storage media storing one or more sequences of stored program instructions which, when executed using a computer system, cause the computer system to:
receive, from a client device, a request to establish a web-based connection with a web server, wherein the request to establish a web-based connection with a web server is associated with credential data of the client device, and wherein the web server is associated with the computer system and a database management system;
in response to receiving the request to establish the web-based connection, perform authentication of the client device based on the credential data of the client device;
in response to the authentication, generate a unique tenant request identifier;
generate a client request comprising a database request, the database request comprising one or more database instructions, wherein the database request is associated with the unique tenant request identifier and a logical address for the database management system, wherein the unique tenant request identifier identifies the database request;
establish a network connection with a web-protocol port of the web server using the logical address for the database management system;
send, over the network connection, the client request to the logical address of the database management system;
authorize, using the unique tenant request identifier, execution by the database management system of at least one database instruction of the one or more database instructions of the database request; and
track a progress of execution of the database request.

12. The one or more computer-readable non-transitory storage media of claim 11, further comprising sequences of stored program instructions which, when executed using the computer system, are operable to query a request coordinator store to determine a state of the client request in response to sending the client request to the logical address of the database management system, wherein the state of the client request comprises an execution state of the at least one database instruction of the one or more database instructions of the database request.

13. The one or more computer-readable non-transitory storage media of claim 12, further comprising sequences of stored program instructions which, when executed using the computer system, are operable to: in response to querying the request coordinator store to determine the state of the client request, request, based at least in part on the state of the client request, the database management system to execute at least one other database instruction of the one or more database instructions of the database request; and update the state of the client request at the request coordinator store.

14. The one or more computer-readable non-transitory storage media of claim 12, further comprising sequences of stored program instructions which, when executed using the computer system, are operable to: in response to sending the client request, receive a request response including result data that is obtained from execution of the at least one database instruction of the one or more database instructions of the database request.

15. The one or more computer-readable non-transitory storage media of claim 14, the request response including information on a failure to execute the at least one database instruction of the one or more database instructions of the database request, the information on the failure to execute being based on the state of the client request.

16. The one or more computer-readable non-transitory storage media of claim 11, further comprising sequences of stored program instructions which, when executed using the computer system, are operable to:
determine the credential data of the client device or a client application of the client device that caused the client request for the web-based connection, wherein the credential data comprises identity information identifying the client device or the client application and a secret associated with the identity information;
use the credential data to enforce multi-tenancy of the database management system, wherein the database management system is associated with database requests of one or more other client devices; and
track a progress of execution of the database requests of the one or more other client devices.

17. The one or more computer-readable non-transitory storage media of claim 11, further comprising sequences of stored program instructions which, when executed using the computer system, are operable to verify the credential data using a credential store associated with the computer system.

18. The one or more computer-readable non-transitory storage media of claim 11, wherein the tracking of the progress of the execution of the database request comprises sending the unique tenant request identifier to the client device.

19. The one or more computer-readable non-transitory storage media of claim 12, further comprising sequences of stored program instructions which, when executed using the computer system, are operable to:
retrieve at least a portion of a result set of the client request from the database management system; and
store at least the portion of the result set of the client request in the request coordinator store in association with the unique tenant request identifier.

20. The one or more computer-readable non-transitory storage media of claim 11, wherein after the sending, over the network connection, of the client request to the logical address of the database management system, a source address of the client request is altered to a load balancer address and the logical address is altered to a worker web server address, the worker web server address associated with a worker web server that is to process the client request and send the at least one database instruction of the one or more database instructions of the database request to a particular database server of the database management system for the execution of the at least one database instruction of the one or more database instructions.

\* \* \* \* \*